Dec. 18, 1962   J. A. SIDERMAN   3,069,668
ALTITUDE CONTROLLED CORRELATOR
Filed Aug. 31, 1960

INVENTOR,
JOSEPH A. SIDERMAN.
BY Harry M. Saragovitz
ATTORNEY.

3,069,668
ALTITUDE CONTROLLED CORRELATOR
Joseph A. Siderman, Shrewsbury, N.J., assignor to the United States of America as represented by the Secretary of the Army
Filed Aug. 31, 1960, Ser. No. 53,317
2 Claims. (Cl. 340—178)
(Granted under Title 35, U.S. Code (1952), sec. 266)

The invention described herein may be manufactured and used by or for the Government for governmental purposes, without the payment of any royalty thereon.

This invention is concerned with meteorological investigations using radiosondes and, more particularly, relates to a new system for correlating the meteorological data obtained from a radiosonde and printed in a radiosonde recorder with the altitude of the radiosonde recorded in a control recorder.

At the present time, the recording equipment most generally used in conjunction with balloon radiosondes is divided into two separate sections. One of these, the control recorder, receives primary data from the tracking equipment in the form of synchro voltages representing the azimuth angle, elevation angle and slant range. The control recorder continuously records this information and the elapsed time from the time at which the balloon was released. It also computes and records the altitude of the radiosonde. Meteorological data, such as temperature and humidity, are continuously recorded in a second recorder section, the radiosonde recorder, which displays the signals broadcast by the radiosonde. Thus, the complete data covering a flight appear on two charts. The control recorder data are printed intermittently, based on periodic intervals of time, and the radiosonde recorder draws continuous traces at a rate of one or two inches per minute.

Prior to this invention, selecting a point on either of the charts required tedious effort on the part of the operator when trying to locate a corresponding point on the second chart. Accurate and rapid evaluation of the data was difficult.

In accordance with this invention an altitude controlled marking device has been developed for correlating the meteorological data on the radiosonde recorder chart with altitude and, therefore, with the information on the control recorder charts. The altitude servo motor which operates the altitude print register in the control recorder is also connected to an altitude synchro generator or transmitter. This altitude transmitting synchro is used to supply a signal representing the altitude of the radiosonde to a receiving synchro in the radiosonde recorder. This receiving synchro then operates a switch which in turn causes a marking pen and/or a numerical indicator-printer to indicate predetermined increments of altitude on the radiosonde recorder chart. A memory unit is provided to prevent erroneous marking by the pen during temporary decreases in altitude and operates in such a manner that no correlation altitude marking will take place until such time as the altitude at which the decrease started is again reached and proceeds upward in a normal manner.

Accordingly, it is an object of this invention to provide a marker device for correlation of the meteorological data on a radiosonde recorder chart with altitude.

Another object of the invention is to provide an altitude-controlled marker device to facilitate evaluation of radiosonde flight records.

A further object of the invention is to provide an altitude-controlled correlation marker device having a memory unit to prevent erroneous marking of the radiosonde recorder chart during hunting of the direction finder antenna or temporary balloon descent.

Further objects and features of the invention will become apparent upon consideration of the following detailed description taken in conjunction with the drawing, in which.

Figure 1:
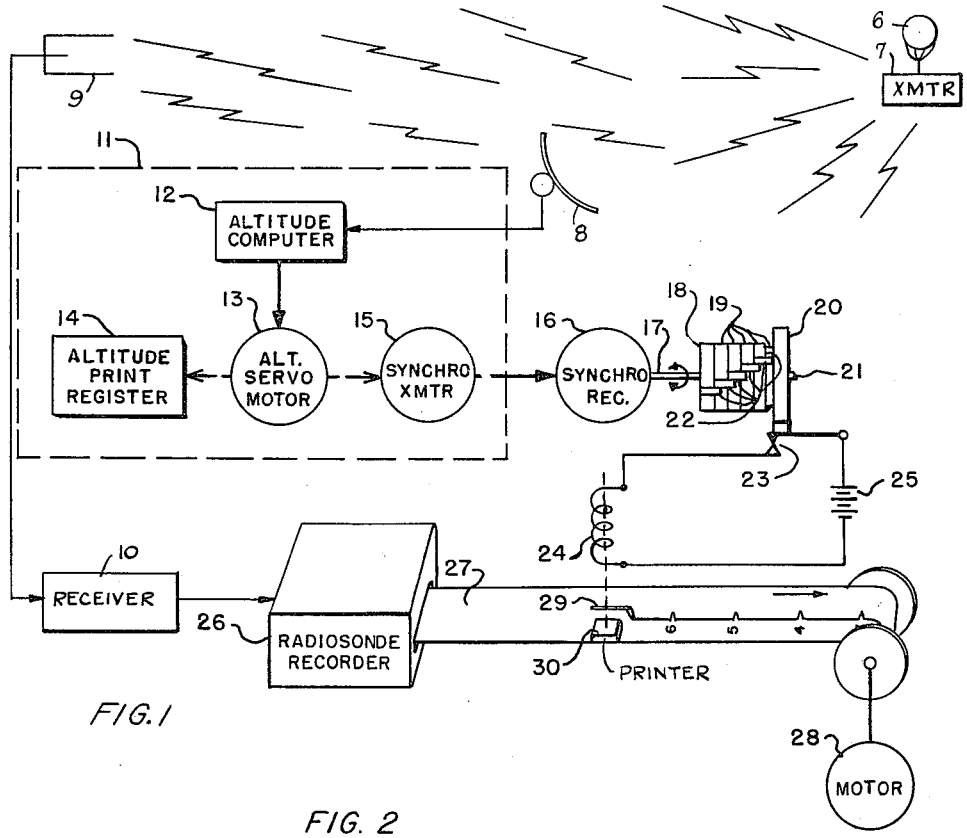
FIG. 1 shows a preferred embodiment of the invention.
Figure 2:
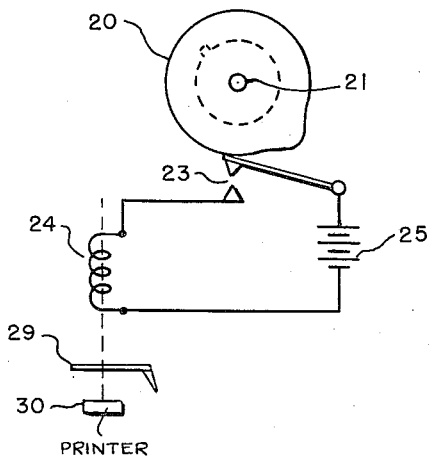
FIG. 2 shows details of the cam arrangement of FIG. 1.

Referring now to the drawing, a conventional balloon radiosonde is shown including a balloon 6 and a radiosonde transmitter 7. The flight of radiosonde 7 is tracked by conventional tracking equipment 8 which supplies tracking data in the form of synchro voltages representing azimuth angle, elevation angle and slant range to a conventional control recorder 11, a portion of which is shown including an altitude computer 12, an altitude servo motor 13, an altitude print register 14, and a servo generator or synchro transmitter 15. Altitude computer 12 determines the altitude of radiosonde 7 from the tracking data and supplies this altitude information to altitude servo motor 13 which operates altitude print register 14 and also positions or turns the rotor of servo generator or transmitting synchro 15, the output of which is supplied to a servo motor or receiving synchro 16. The rotor of receiving synchro 16 is fitted to a shaft 17 which is also firmly attached to the center of a first circular disk 18. A plurality of additional circular disks 19, having the same diameter as disk 18, and a cam 20 are mounted on a fixed shaft 21 which is longitudinally aligned with motor shaft 17 and passes through the axes of disks 19 and cam 20, all of which are free to rotate independently in either direction on shaft 21. On the circumference of each of disks 18 and 19 is a projecting member or finger 22 which is wider than the disk. The disks are arranged on shaft 21 so that the fingers 22 overlap to form a positive connection between adjacent disks so long as the fingers 22 are in contact and rotation is such that the finger of the disk nearest the motor 16 pushes on the finger 22 of the next disk and so on. The disk 19 which is adjacent cam 20 is firmly attached thereto so that this disk 19 and cam 20 rotate as a single unit. Cam 20 is adapted to intermittently close a pair of normally open contacts 23 which are connected in series between the energizing coil of a relay 24 and a suitable source of potential 25.

The signals containing meteorological data broadcast by radiosonde transmitter 7 are picked up by an antenna 9 and supplied to a conventional receiver 10 which in turn supplies the information contained in these signals to a conventional radiosonde recorder 26 having a chart 27 upon which the meteorological data are continuously stored. Chart 27 is driven by a suitable means such as motor 28. A marking pen 29 and/or a numerical indicator-printer 30 are connected to the armature of relay 24. Pen 29 draws a continuous straight line on chart 27 except when contacts 23 are closed by cam 20 to energize relay 24 which in turn pulls or deflects pen 29 to one side and energizes printer 30. As soon as contacts 23 open, pen 29 returns to its original position and printer 30 is de-energized.

In the preferred embodiment of the invention shown in the drawing, synchro motor 16 and the associated components and circuit for operating pen 29 and indicator-printer 30 are indicated as being remote from control recorder 11. However, all of this portion of the apparatus could be included in control recorder 11. Also, if this were done, synchro transmitter 15 and motor 16 could be eliminated and shaft 17 would then be connected to the armature of altitude servo motor 13. Operation of the system would be the same as that outlined below for the arrangement shown in the drawing.

In order to more clearly describe the different parts of the system shown in FIG. 1, tracking equipment 8 and antenna 9 have been shown as separate elements. However, in actual practice the function of antenna 9 could be incorporated in the antenna used in tracking equipment 8.

The operation of the system will now be described. In control recorder 11 altitude computer 12 computes the altitude of the radiosonde from the elevation angle and range supplied to control recorder 11 by the tracking equipment. The electrical output of altitude computer 12 is supplied to servo motor 13 which mechanically drives altitude print register 14 and the rotor of synchro transmitter 15. Each revolution of the rotor of synchro transmitter 15 represents a predetermined increment of altitude, and for purposes of illustration, assume that the system is adjusted so that synchro transmitter 15 transmits the altitude in the form of a synchro voltage to synchro motor 16 at the rate of 1,000 feet per revolution. Thus, each revolution of output shaft 17 of motor 16 represents 1,000 feet of altitude and the direction of rotation is indicative of increases or decreases in the altitude of radiosonde balloon 6. Under normal conditions, i.e., when radiosonde balloon 6 is continuously rising, assume that the direction of rotation of shaft 17 is clockwise as seen from cam 20 and fingers 22 of disks 18 and 19 overlap in the manner shown in the drawing to provide a positive drive between shaft 17 and cam 20. Thus, for each revolution of shaft 17, cam 20 will make one revolution closing contacts 23 once each revolution or 1,000 feet. Each time contacts 23 are closed, relay 24 is energized and causes pen 29 to move or be deflected to one side thereby marking the radiosonde recorder chart 27 to represent 1,000 foot intervals of increasing altitude of radiosonde balloon 6. Of course it is understood that rotation of shaft 17 for increasing altitude could be counter-clockwise as seen from cam 20 if so desired.

For the normal operation outlined above, it can be seen that the system functions in the same manner as it would if shaft 17 were connected directly to cam 20. However, in order to avoid confusion in interpretation of the data on the recorder chart 27, it is desirous to prevent marking when the altitude of balloon 6 temporarily decreases or hunting of the elevation angle by the tracking apparatus causes apparent decreases in altitude. Coupling shaft 17 to cam 20 through disks 18 and 19 prevents such erroneous marking. If the altitude of radiosonde balloon 6 should decrease for either of the reasons noted above, shaft 17 of motor 16 would turn counter-clockwise as seen from cam 20. When this occurs, fingers 22 no longer provide a positive drive between shaft 17 and cam 20 since finger 22 of disk 18 would be turned or pulled away from finger 22 of the adjacent disk 19. Thus cam 20 would not turn in either direction until positive connection was once again attained. Since each of disks 19, except the last which is firmly attached to and rotates with cam 20, rotates independently, it can be seen that shaft 17 can rotate counter-clockwise as many revolutions as there are disks 19 without disturbing or turning cam 20 and then rotate the same number of revolutions back again or clockwise before once again turning cam 20. In other words, disks 19 with fingers 22 provide an altitude memory function in the drive which prevents erroneous activation of marking pen 29 during real or apparent temporary reductions in altitude of radiosonde balloon 6 which cause shaft 17 to rotate counter-clockwise. This memory function provides further protection in that when altitude again increases normally, no activation of marking pen 29 will occur until such time that the original altitude, that is, the altitude where the decrease started, is again reached and proceeds upward in a normal manner.

For example, assume that the altitude drops 2,000 feet during a flight. Just prior to this drop, shaft 17 would be rotating clockwise and disks 18 and 19 and overlapping fingers 22 would be in the relative positions shown in the drawing providing a positive drive between shaft 17 and cam 20. When the altitude decrease begins, shaft 17 and disk 18 turn counter-clockwise as seen from cam 20, and cam 20 stops turning since finger 22 of disk 18 no longer pushes on finger 22 of the adjacent disk 19. When disk 18 has made one complete counter-clockwise revolution, signifying an altitude decrease of 1,000 feet, finger 22 of disk 18 will push on finger 22 of the adjacent disk 19 on the other side and cause it also to rotate in the counter-clockwise direction. These two disks will rotate in this manner for one more revolution signifying a total altitude decrease of 2,000 feet. When the altitude then increases again, disk 18 will rotate clockwise for one revolution (1,000 feet) at which time its finger 22 will catch finger 22 of adjacent disk 19 on the first or normal side, and the two disks will turn clockwise together for one more revolution. Then all the disks will once again be in the relative positions shown in the drawing and resumption of normal operation will begin at precisely the altitude which was reached before the decrease. It can be seen that the memory function provided by disks 19 is increased 1,000 feet for each disk 19. Thus if a memory of 5,000 feet is desired, five disks 19, including the one fastened to cam 20, must be provided. The number of disks 19 can be varied to suit the requirements for which the system will be used.

Prior to each operation of the system, disks 18, 19, and cam 20 must be reset to the relative positions shown in the drawing, so that normal operation may begin immediately upon release of radiosonde balloon 6. Cam 20 can also be reset to any desired initial altitude to correspond to a particular reference point, such as the altitude of the release station above sea level, so that the marks made on chart 27 and/or the altitude indicated by numerical indicator-printer 30 will correspond to the altitude of radiosonde 7 above the chosen reference point.

It should be noted that disks 19 and cam 20 could also be mounted on shaft 17 thereby eliminating the need for the second shaft 21 shown in the drawing. If this is done, cam 20 should meet with sufficient resistance upon closing contacts 23 so that the contacts can be closed only when disk 18, which is the only disk fastened to shaft 17, actually pushes or drives cam 20 through a positive connection established when all the disks are in the relative position shown in the drawing. Disks 19 and cam 20 would be free to rotate independently of one another and would not be fastened to shaft 17 but would be rotatably mounted thereon. The operation of such an embodiment would be the same as that described above when both shafts 17 and 21 are used.

The closing of switch 23 could also be used to cause a pulse to be sent back to control recorder 11 to cause operation of the printer mechanism therein in synchronism with the marking of radiosonde recorder chart 27. This could be done in addition to or in place of normal time-controlled printing used in control recorder 11.

It is apparent that the above described apparatus provides an altitude-controlled marker device which will enable rapid and accurate evaluation of radiosonde flight records. The memory function provided by disks 19 ensures that erroneous marking of altitude on the radiosonde recorder chart during temporary balloon descent (real or apparent) and the subsequent rise to the altitude at which the descent started will not take place.

It is to be understood that the specific embodiment of the invention described is merely illustrative of the principles of the invention and that various changes and modifications may be made without departing from the spirit and scope of the invention as set forth in the appended claims.

What is claimed is:

1. The combination with a control recorder and a radiosonde recorder each having an output chart for use in recording radiosonde flight data, of altitude computing means in said control recorder, a synchro receiver having a rotatable output shaft, a synchro transmitter connected to the output of said altitude computing means for supplying a signal representing the altitude of said radiosonde to said synchro receiver, a cam-operated switch means, means for coupling said synchro receiver to said cam operated switch means, said coupling means including means permitting a limited number of reverse turns of said output shaft without driving said cam operated switch means, and marking means operated by said switch means for indicating predetermined increments of altitude on the output chart of said radiosonde recorder, said memory unit preventing operation of said switch means by said synchro receiver during temporary decreases of altitude as determined by said altitude computing means until the altitude at which such decreases began is again reached.

2. A system for correlating the meteorological data on a radiosonde recorder chart with the altitude of the radiosonde including first means for determining said altitude, a receiver, transmitting means responsive to said first means for supplying a signal representing said altitude to said receiver marking means, means for coupling said receiver to said marking means, said marking means being associated with said recorder chart for indicating increments of altitude thereon, said coupling means including means permitting limited free reverse movement of said receiver before actuation of said marking means thus preventing operation of said marking means during temporary decreases of altitude as indicated by the output of said receiver.

References Cited in the file of this patent
UNITED STATES PATENTS

| | | |
|---|---|---|
| 1,444,886 | Rounds | Feb. 13, 1923 |
| 2,712,128 | Woodruff | June 28, 1955 |
| 2,861,263 | McLucas | Nov. 18, 1958 |